United States Patent Office 3,577,436
Patented May 4, 1971

3,577,436
2-SUBSTITUTED-CYCLOPENTA[β]
THIANAPHTHENE-3-ONES
John T. Suh, Mequon, Wis., assignor to Colgate-
Palmolive Company, New York, N.Y.
No Drawing. Continuation-in-part of application Ser. No.
599,698, Dec. 7, 1966. This application Nov. 25, 1969,
Ser. No. 879,904
Int. Cl. A61k 27/00; C07d 63/22
U.S. Cl. 260—330.5    6 Claims

ABSTRACT OF THE DISCLOSURE

The compounds are 2-substituted-cyclopenta[β]thianaphthene-3-ones useful as tranquilizing agents. A compound disclosed is 1-H-2(dimethylaminomethyl)cyclopenta[β]thianaphthene-3-one.

RELATED CASES

The present application is a continuation-in-part of my earlier application No. 599,698 filed Dec. 7, 1966, now U.S. Pat. No. 2,492,294, issued Jan. 27, 1970.

DETAILED DESCRIPTION

The compounds of the present invention have the following formulae

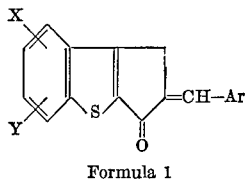
Formula 1

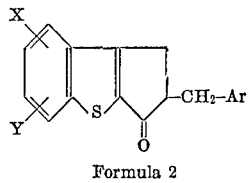
Formula 2

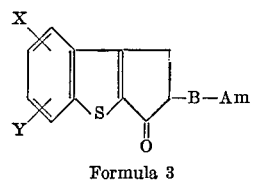
Formula 3 wherein X and Y are hydrogen, halogen such as chloro, bromo or fluoro, hydroxy, nitro, amino, substituted amino such as diloweralkyl amino, lower alkyl such as methyl, ethyl, propyl or isopropyl, lower alkoxy such as methoxy, ethoxy or propoxy and trifluoromethyl, Ar is an aryl or a heterocyclic group selected from

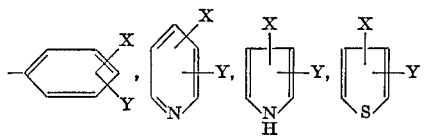

and

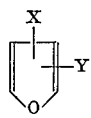

in which X and Y are as previously described, B is an alkylene of 1 to 5 and Am is

in which $R_1$ and $R_2$ may be hydrogen, lower alkyl of 1 to 8 carbon atoms, hydroxy-lower alkyl, an alkoxy alkyl, an alkenyl of 3 to 6 carbons such as allyl, 3-butenyl or 5-hexenyl, an aryl such as phenyl or a nuclear substituted phenyl such as p-chlorophenyl, an aralkyl of 7 to 11 carbon atoms, particularly phenyl-lower alkyl such as benzyl, phenyl-ethyl, phenyl-isopropyl and phenyl-butyl, a cycloalkyl of 3 to 7 carbon atoms such as cyclopentyl and cyclohexyl, a cycloalkyl-lower alkyl in which the cycloalkyl has 3 to 7 carbon atoms such as cyclopentyl methyl and cyclohexyl methyl, and groups in which $R_1$ and $R_2$ are joined together to form amino groups in which the nitrogen is part of a cyclic group such as morpholino, pyrrolidino, piperidino, a lower alkyl piperazino such as N-methyl piperazino, N-phenyl-lower alkyl piperazino or N-hydroxy-lower alkyl piperazino, or Am is

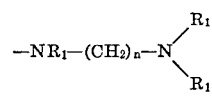

in which

is a tertiary amino group and $n$ is 2 to 6, or Am is a cyclic amine group bonded through a nuclear carbon to B, including such groups as N-lower alkyl-2,3 or 4-piperidyls such as N-methyl-3-piperidyl, N-ethyl-4-piperidyl, N-ethyl-2-piperidy and N-isopropyl-3-piperidyl, N-(di-lower alkyl amino-lower alkyl)-2,3 or 4-piperidyls such as N-(beta-dimethylaminopropyl)-4-piperidyl, N-(beta-diethylaminoethyl) 3-piperidyl and N-(beta-dimethylaminopropyl)-2-piperidyl, N-phenyl-lower alkyl-3 or 4-piperidyls such as N-benzyl-3-piperidyl, N-phenyl-ethyl-4-piperidyl and N-phenylpropyl-3-piperidyl, 2-piperidyl, 3-piperidyl and 4-piperidyl, 2-pyrrolidyl, 3-pyrrolidyl, N-lower alkyl-2 or 3-pyrrolidyls such as N-methyl-2-pyrrolidyl, N-ethyl-3-pyrrolidyl, N-propyl-4-pyrrolidyl, and N-phenyl-lower alkyl-2 or 3-pyrrolidyls such as N-benzyl-2-pyrrolidyl and N-phenyl-ethyl-3-pyrrolidyl.

The compounds of Formula 1 of the present invention may be conveniently prepared by employing as the starting material a 1H-cyclopenta[β]thianaphthene-3-one of the formula

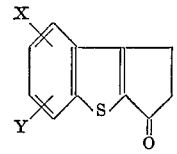

The ketones may be conveniently prepared as described in the literature (M. P. Cagniant and Mme. P. Cagniant: Bulletin de la Societe Chimique de France, pp. 185–190, (1953)).

Representative of the ketones which may be employed as starting materials are the following:

1H-cyclopenta[β]thianaphthene-3-one,
5-methoxy-1H-cyclopenta[β]thianaphthene-3-one,
6-chloro-1H-cyclopenta[β]thianaphthene-3-one, and
7-trifluoromethyl-1H-cyclopenta[β]thianaphthene-3-one.

In the preferred method of preparation of the compounds of Formula 1, the selected ketone is treated with a suitable aromatic aldehyde in the presence of a suitable base, such as potassium hydroxide, preferably at reflux temperatures, until the reaction is substantially complete. The desired compound is then isolated from the reaction mixture by conventional techniques, e.g. distillation or recrystallization. In addition to potassium hydroxide, other bases such as sodium hydroxide, sodium methoxide, sodium ethoxide, sodium amide, potassium t butoxide, triethylamine, morpholine, and piperidine may be employed in catalytic amounts.

The described process may be diagrammed as follows:

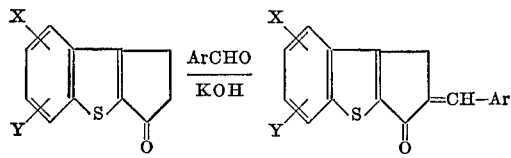

in which X and Y are as previously defined and are groups which do not interfere with or partake in the reaction.

Among the aldehydes that may be employed in the process are the following:

benzaldehyde,
p-methoxybenzaldehyde,
p-chlorobenzaldehyde,
2-pyridinecarboxaldehyde,
3-pyridinecarboxaldehyde,
4-pyridinecarboxaldehyde,
m-dimethylaminobenzaldehyde,
2-furaldehyde,
2-thiophenecarboxaldehyde,
3-thiophenecarboxaldehyde,
2-pyrrolecarboxaldehyde, and
3-pyrrolecarboxaldehyde.

Representative of the compounds which may be prepared by the described process are the following:

1H-2(4-pyridylmethylene)cyclopenta[β]thianaphthene-3-one,
1H-2(3-pyridylmethylene)cyclopenta[β]thianaphthene-3-one,
1H-2(2-pyridylmethylene)cyclopenta[β]thianaphthene-3-one,
1H-2(p-benzylidene)cyclopenta[β]thianaphthene-3-one,
1H-2(p-dimethylaminobenzylidene)cyclopenta[β]thianaphthene-3-one,
1H-2(2-furylmethylene)cyclopenta[β]thianaphthene-3-one,
1H-2(2-thienylmethylene)cyclopenta[β]thianaphthene-3-one,
1H-2(3-thienylmethylene)cyclopenta[β]thianaphthene-3-one,
1H-2(3-pyrrylmethylene)cyclopenta[β]thianaphthene-3-one, and
1H-2(2-pyrrylmethylene)cyclopenta[β]thianaphthene-3-one.

The compounds of Formula 2 are preferably prepared by dissolving an appropriate ketone in a suitable reaction medium, such as 1,2-dimethoxyethane, and then treating the solution with an appropriate ester in the presence of a non-participating base, for example, an alkali amide such as sodium amide.

The described process may be illustrated as follows

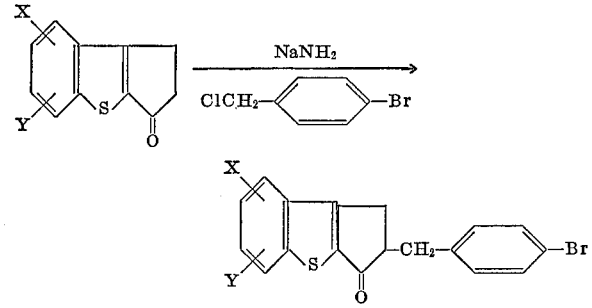

wherein X and y are previously defined and do not partake in or interfere with the reaction.

Among the esters which may be employed in the above described process are the following:

p-dimethylaminobenzyl chloride,
m-trifluoromethylbenzyl bromide,
4-picolyl chloride,
3-furylmethyl chloride, and
2-thienylmethyl chloride.

Representative of the compounds which may be prepared in the described manner are the following:

1H-2(p-dimethylaminobenzyl)cyclopenta[β]thianaphthene-3-one,
1H-2(m-trifluoromethylbenzyl)cyclopenta[β]thianaphthene-3-one,
1H-2(4'-picolyl)cyclopenta[β]thianaphthene-3-one,
1H-2(3'-furylmethyl)cyclopenta[β]thianaphthene-3-one, and
1H-2(2'-thienylmethyl)cyclopenta[β]thianaphthene-3-one.

The compounds of Formula 2 also may be prepared by the selective reduction of the exocyclic double bond of the compounds of Formula 1. The reduction is preferably conducted under catalytic hydrogenation conditions in the presence of a suitable catalyst, such as palladium on carbon.

The described process may be illustrated as follows:

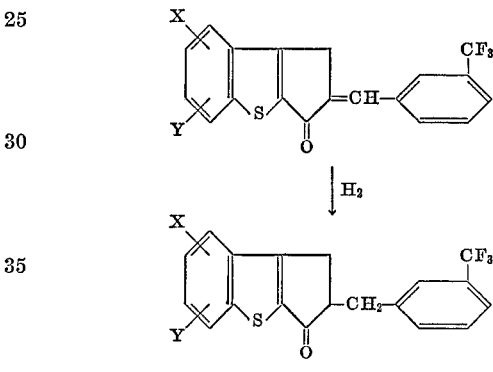

wherein X and Y are as previously defined and do not partake in or interfere with the reaction.

The compounds of Formula 3 in which B is an alkylene of 2 to 5 carbon atoms are preferably prepared by dissolving an appropriate ketone in a suitable reaction medium such as 1,2-dimethoxyethane and then treating the solution with an appropriate amino alkyl ester in the presence of a non-participating base, for example, an alkali amide such as sodium amide. Although other bases such as phenyl lithium, butyl lithium and potassium t butoxide can be employed in the described process, the alkali amides are preferred.

The above described process may be illustrated as follows:

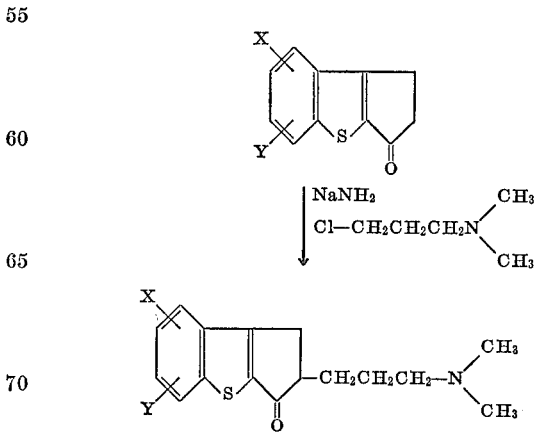

wherein X and Y are as previously defined and do not partake in or interfere with the reaction.

Representative of the aminoalkyl esters which can be employed in the described process are the following:

3-dimethylaminopropyl chloride,
4-methylpiperazinoethyl bromide,
2-dimethylaminoethyl tosylate,
1-methyl-4-piperidyl chloride,
pyrrolidinoethyl chloride, and
morpholinoethyl chloride.

Representative of the compounds which may be prepared by the described process are the following:

1H-2(3'-dimethylaminopropyl)cyclopenta[β]thianaphthene-3-one,
1H-2(4'-methylpiperazinoethyl)cyclopenta[β]thianaphthene-3-one,
1H-2(2'-dimethylaminoethyl)cyclopenta[β]thianaphthene-3-one,
1H-2(1'-methyl-4-piperidyl)cyclopenta[β]thianaphthene-3-one,
1H-2(pyrrolidinoethyl)cyclopenta[β]thianaphthene-3-one,
1H-2(morpholinoethyl)cyclopenta[β]thianaphthene-3-one,
5-methoxy-1H-2(3'-dimethylaminopropyl)cyclopenta[β]thianaphthene-3-one,
6-chloro-1H-2(3'-diethylaminopropyl)cyclopenta[β]thianaphthene-3-one, and
7-trifluoromethyl-1H-2(3'-dimethylaminopropyl)cyclopenta[β]thianaphthene-3-one.

The compounds of Formula 3 of the present invention in which B is methylene also may be conveniently prepared by employing the previously described 1H-cyclopenta[β]thianaphthene-3-ones as starting materials.

In the preferred method of preparation of the compounds of Formula 3 in which B is methylene, the ketone is dissolved in a suitable reaction medium, such as dimethylformamide, and treated under reflux conditions with an appropriate amine such as dimethylamine hydrochloride in the presence of formaldehyde (20–40% aqueous solution) or paraformaldehyde. The desired product is then isolated from the reaction product by conventional techniques.

The described process may be diagrammed as follows:

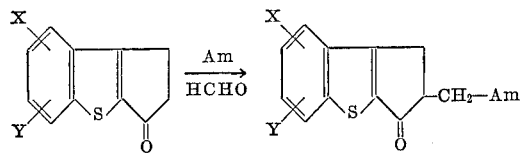

in which X and Y are previously defined and do not partake in or interfere with the reaction.

Among the amines that may be employed, preferably as their hydrohalide salts, in the above described process are the following:

| | |
|---|---|
| methylamine, | diethylamine, |
| ethylamine, | diethanolamine, |
| β-hydroxyethylamine, | piperidine, |
| β-chloroethylamine, | N-methylpiperazine, |
| benzylamine, | morpholine, and |
| β-phenethylamine, | methylaniline. |
| dimethylamine, | |

Representative of the compounds which can be prepared by the described process are the following:

1H-2(dimethylaminomethyl)cyclopenta[β]thianaphthene-3-one,
1H-2(methylaminomethyl)cyclopenta[β]thianaphthene-3-one,
1H-2(ethylaminomethyl)cyclopenta[β]thianaphthene-3-one,
1H-2(β-hydroxyethylaminomethyl)cyclopenta[β]thianaphthene-3-one,
1H-2(β-chloroethylaminomethyl)cyclopenta[β]thianaphthene-3-one,
1H-2(benzylaminomethyl)cyclopenta[β]thianaphthene-3-one,
1H-2(phenethylaminomethyl)cyclopenta[β]thianaphthene-3-one,
1H-2(dimethylaminomethyl)cyclopenta[β]thianaphthene-3-one,
1H-2(diethylaminomethyl)cyclopenta[β]thianaphthene-3-one,
1H-2(piperidinomethyl)cyclopenta[β]thianaphthene-3-one,
1H-2(N-methylpiperazinomethyl)cyclopenta[β]thianaphthene-3-one, and
1H-2(morpholinomethyl)cyclopenta[β]thianaphthene-3-one.

Acid addition salts of the compounds of the present invention, which are capable of forming such salts, may be conveniently prepared by contacting the compounds with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the compounds of Formula 3 with a suitable alkylating agent such as dimethyl sulfate or an alkyl halide such as methyl chloride, methyl iodide or ethyl bromide.

The novel compounds of the present invention and their pharmaceutically acceptable salts have utility as antihypertensive and diuretic agents. In addition, they exhibit a transquilizing effect exemplified by a reduction in the antisocial behavior in aggressive animals. For example, the compound 1H-2(dimethylaminomethyl)cyclopenta[β]thianaphthene-3-one hydrochloride was effective in intraperitoneal doses of about 15 mg./kg. of body weight in decreasing aggressive behavior induced in mice through isolation.

The compounds are preferably combined with one or more suitable pharmaceutical diluents and formed into unit dosage forms. Such dosage forms provide suitable means for oral and parenteral administration.

The pharmaceutical diluents which may be employed may be either liquid or solid, but the preferred liquid carrier is water. In the event the compound is not soluble in water a pharmaceutically acceptable organic solvent such as propylene glycol may be employed.

Solid pharmaceutical diluents such as starch, sugar and talc can be utilized to form powders which can in turn be used as such or may be tableted or encapsulated. In addition to the forementioned material, a wide variety of conventional pharmaceutical lubricants, disintegrating agents, flavoring agents and the like, may also be employed.

The unit dosage forms may contain a concentration of 0.1% to 10% or more by weight of one or more of the novel compounds. Generally, such dosage forms will contain about 5 to 150 mg. of the active ingredients. One or more of such dosage forms may be administered daily.

The following examples are presented to illustrate this invention:

EXAMPLE 1

1H-cyclopenta[β]thianaphthene-3-one

A solution of 2.7 g. (0.0131 mole) of β(3-thianaphthenyl)propionic acid in 50 ml. of thionyl chloride is allowed to reflux for 25 minutes and the excess thionyl chloride distilled in vacuo. To the residue in 50 ml. of anhydrous benzene is added in portions 3 g. of anhydrous aluminum chloride with cooling and the reaction mixture stirred overnight at room temperature. The reaction mixture is cooled and treated with ice water, and 25 ml. of 10% hydrochloric acid solution. The organic layer is separated and the aqueous layer extracted with 50 ml. of benzene. The combined benzene solution is washed successively with water, saturated sodium bicarbonate, water, and dried over anhydrous sodium sulfate. The benzene solution is distilled in vacuo and the residue recrystallized from ethanol to give 2.0 g. (81.5% of 1H-cyclopenta[β]thianaphthene-3-one, M.P. 160–161° (lit. M.P. 161°).

Analysis.—Calcd. for $C_{11}H_8OS$ (percent): S, 17.03, Found (percent): S, 17.07.

EXAMPLE 2

1H-2(4 - pyridylmethylene)cyclopenta[β]thianaphthene-3-one

To a refluxing solution of 11.6 g. (0.062 mole) of 1H-cyclopenta[β]thianaphthene-3-one in 250 ml. of absolute ethanol is added 7.5 g. (0.07 mole) of 4-pyridinecarboxaldehyde and 0.3 g. potassium hydroxide. The resulting reaction mixture is allowed to reflux for 7½ hours. The reaction mixture is distilled under diminished pressure to remove the solvent and the residue recrystallized from methanol to give 13.5 g. (78.5%) of 1H-2-(4-pyridylmethylene)cyclopenta[β]thianaphthene-3-one, M.P. 304°.

Analysis.—Calcd. for $C_{17}H_{11}NOS$ (percent): C, 73.62; H, 4.00; N, 5.05; S, 11.55. Found (percent): C, 73.49; H, 3.93; N, 4.78; S, 11.76.

EXAMPLE 3

1H-2(4 - pyridylmethylene)cyclopenta[β]thianaphthene-3-one methiodide

A solution of 3 g. (0.0109 mole) of 1H-2(4-pyridylmethylene)cyclopenta[β]thianaphthene-3-one and 15 ml. of methyl iodide in 150 ml. of chloroform is allowed to reflux for four hours. The yellow crystalline product is filtered and recrystallized from ethanol to give 4.0 g. (87%) of 1H - 2(4-pyridylmethylenecyclopenta[β]thianaphthene-3-one methiodide, M.P. 284–286°.

Analysis.—Calcd. for $C_{18}H_{14}INOS$ (percent): N, 3.34; S, 7.64. Found (percent): N, 3.39; S, 7.75.

EXAMPLE 4

1H - 2(3-pyridylmethylene)cyclopenta[β]thianaphthene-3-one

To a refluxing solution of 5.8 g. (0.031 mole) of 1H-cyclopenta[β]thianaphthene-3-one in 200 ml. of absolute ethanol is added 3.75 g. (0.038 mole) of 3-pyridinecarboxaldehyde and 0.3 g. of potassium hydroxide. The resulting solution is allowed to reflux for 3 hours. The reaction mixture is distilled under diminished pressure to remove the solvent. The residue is washed with 150 ml. of water, filtered, and recrystallized from benzene-petroleum ether to obtain 7.2 g. of a crude light yellow product, M.P. 178–180°. Aften an additional recrystallization from ethanol-benzene 6.5 g. (67.3%) of 1H-2(3-pyridylmethylene)cyclopenta[β]thianaphthene-3-one, M.P. 262–263° is obtained.

Analysis.—Calcd. for $C_{17}H_{11}NOS$ (percent): C, 73.62; H, 4.00; N, 5.05; S, 11.55. Found (percent): C, 73.28; H, 4.25; N, 4.73; S, 11.57.

EXAMPLE 5

1H-2(p-dimethylaminobenzylidene)cyclopenta[β]thianaphthene-3-one

To a refluxing solution of 5 g. (0.026 mole) of 1H-cyclopenta[β]thianaphthene-3-one in 250 ml. of absolute ethanol is added 5 g. (0.034 mole) of p-dimethylaminobenzaldehyde and 0.3 g. of potassium hydroxide. The resulting reaction mixture is allowed to reflux for 4 hours. The reaction mixture is cooled and the bright yellow solid filtered and recrystallized from chloroform to give 6.5 g. (77.5%) of 1H-2(p-dimethylaminobenzylidene)cyclopenta[β]thianaphthene-3-one as bright yellow crystalline plates, M.P. 314–317°.

Analysis.—Calcd. for $C_{20}H_{17}NOS$ (percent): S, 10.04. Found (percent): S, 9.77.

EXAMPLE 6

1H-2(2-pyridylmethylene)cyclopenta[β]thianaphthene-3-one

To a refluxing solution of 3 g. (0.016 mole) of 1H-cyclopenta[β]thianaphthene-3-one in 150 ml. of methanol is added in portions 2.2 g. (0.02 mole) of 2-pyridinecarboxaldehyde and 0.2 g. of potassium hydroxide. The resulting reaction mixture is allowed to reflux for one hour. The light yellow solid is filtered and recrystallized from methanol to give 3.8 g. (85.5%) of 1H-2(2-pyridylmethylene)cyclopenta[β]thianaphthene-3-one, light yellow needles, M.P. 210–211°.

Analysis.—Calcd. for $C_{17}H_{11}NOS$ (percent): S, 11.55. Found (percent): S, 11.42.

EXAMPLE 7

1H-2(dimethylaminomethyl)cyclopenta[β]thianaphthene-3-one hydrochloride

To a warm solution of 5.0 g. (0.026 mole) 1H-cyclopenta[β]thianaphthene-3-one in 70 ml. of dimethylformamide is added with stirring 2.2 g. (0.026 mole) of dimethylamine hydrochloride and 0.8 g. (0.026 mole) of paraformaldehyde and the resulting solution allowed to reflux gently for 90 minutes. The reaction mixture is cooled and diluted with 200 ml. of anhydrous ether. The dark brown solid product (4.0 g.) is filtered and recrystallized from ethanol-ether to give 1.3 g. (17.7%) of 1H - 2(dimethylaminomethyl)cyclopenta[β]thianaphthene-3-one hydrochloride, M.P. 168–170°.

Analysis.—Calcd. for $C_{14}H_{16}ClNOS$ (percent): S, 11.36. Found (percent): S, 11.15.

EXAMPLE 8

When an equimolar amount of 1H-cyclopenta[β]thianaphthene-3-one in dimethoxyethane and an equimolar amount of 3-dimethylaminopropyl chloride,
4-methylpiperazino ethyl bromide,
2-dimethylaminoethyl tosylate,
1-methyl-4-piperidyl chloride,
pyrrolidinoethyl chloride, or
morpholinoethyl chloride, respectively, are reacted in the presence of sodium amide the following compounds are obtained:

1H - 2(3' - dimethylaminopropyl)cyclopenta[β]thianaphthene-3-one,
1H - 2(4'-methylpiperazinoethyl)cyclopenta[β]thianaphthene-3-one,
1H - 2(2' - dimethylaminoethyl)cyclopenta[β[thianaphthene-3-one,
1H - 2(pyrrolidinoethyl)cyclopenta[β]thianaphthene - 3-one, and
1H - 2(morpholinoethyl)cyclopenta[β]thianaphthene - 3-one, respectively.

I claim:
1. A compound selected from compounds having the formula

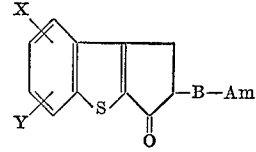

wherein X and Y are selected from hydrogen, halogen, or trifluoromethyl, B is an alkylene of 1 to 3 carbons and Am is selected from

in which $R_1$ and $R_2$ are selected from hydrogen, lower alkyl, hydroxy-lower alkyl, aralkyl of 7 to 11 carbon atoms, and groups in which $R_1$ and $R_2$ are joined together to form an amino group selected from morpholino, pyrrolidino, piperidino, and 4-lower alkyl-1-piperazino, and N-methyl-4-piperidyl, and pharmaceutically acceptable nontoxic acid addition salts thereof.

2. A compound of claim 1 in which X and Y are hydrogen.

3. A compound of claim 1 in which Am is

in which $R_1$ and $R_2$ are selected from hydrogen, lower alkyl and phenyl-lower alkyl.

4. A compound of claim 1 in which X and Y are hydrogen and Am is

in which $R_1$ and $R_2$ are selected from hydrogen, lower alkyl and phenyl-lower alkyl.

5. A compound of claim 1 in which $n$ is 1.

6. A compound of claim 1 in which X and Y are hydrogen, $n$ is 1 and Am is

in which $R_1$ and $R_2$ are methyl.

References Cited

UNITED STATES PATENTS

| | | | |
|---|---|---|---|
| 3,497,528 | 2/1970 | Suh | 260—330.5 |
| 3,492,294 | 1/1970 | Suh | 260—240 |

HENRY R. JILES, Primary Examiner

C. M. SHURKO, Assistant Examiner

U.S. Cl. X.R.

260—240R, 240A, 240.1, 247.1, 267, 293.4D, 294.8B, 326, 5SA, 326.82, 326.9, 999